United States Patent
Wu et al.

(10) Patent No.: US 9,973,562 B2
(45) Date of Patent: May 15, 2018

(54) SPLIT PROCESSING OF ENCODED VIDEO IN STREAMING SEGMENTS

(71) Applicant: Microsoft Technology Licensing, LLC, Redmond, WA (US)

(72) Inventors: Yongjun Wu, Bellevue, WA (US); Shyam Sadhwani, Bellevue, WA (US); Wenbo Zhang, Sammamish, WA (US); Sudhakar V. Prabhu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 14/690,058

(22) Filed: Apr. 17, 2015

(65) Prior Publication Data
US 2016/0308931 A1   Oct. 20, 2016

(51) Int. Cl.
*H04N 7/12*    (2006.01)
*H04N 11/02*   (2006.01)
(Continued)

(52) U.S. Cl.
CPC .......... *H04L 65/608* (2013.01); *H04L 65/607* (2013.01); *H04L 67/02* (2013.01);
(Continued)

(58) Field of Classification Search
CPC ............................ H04N 7/50; H04N 7/26271
(Continued)

(56) References Cited

U.S. PATENT DOCUMENTS 8,379,851 B2   2/2013   Mehrotra et al.
8,918,533 B2   12/2014  Chen et al.
(Continued)

FOREIGN PATENT DOCUMENTS

EP    2 637 414      9/2013
WO    2014162750 A1  10/2014

OTHER PUBLICATIONS

International Search Report and Written Opinion, International Application No. PCT/US2016/025964, dated Jun. 23, 2016, 15 pages.
(Continued)

*Primary Examiner* — Chikaodili E Anyikire
(74) *Attorney, Agent, or Firm* — Klarquist Sparkman, LLP

(57) ABSTRACT

Techniques are described for split processing of streaming segments in which processing operations are split between a source component and a decoder component. For example, the source component can perform operations for receiving a streaming segment, demultiplexing the streaming segment to separate a video content bit stream, scanning the video content bit stream to find a location at which decoding can begin (e.g., scanning up to a first decodable I-picture, for which header parameter sets are available for decoding), and send the video content bit stream to the decoder component beginning at the location (e.g., the first decodable I-picture). The decoder component can begin decoding at the identified location (e.g., the first decodable I-picture). The decoder component can also discard subsequent pictures that reference a reference picture not present in the video content bit stream (e.g., when decoding starts with a new streaming segment).

20 Claims, 8 Drawing Sheets

(51) Int. Cl.
   *H04N 11/04*     (2006.01)
   *H04L 29/06*     (2006.01)
   *H04L 29/08*     (2006.01)
   *H04N 21/44*     (2011.01)
   *H04N 21/845*    (2011.01)
   *H04N 21/434*    (2011.01)

(52) U.S. Cl.
   CPC ... *H04N 21/4341* (2013.01); *H04N 21/44016* (2013.01); *H04N 21/8456* (2013.01)

(58) Field of Classification Search
   USPC .................................................. 375/240.01
   See application file for complete search history.

(56) References Cited

U.S. PATENT DOCUMENTS

| | | | |
   |---|---|---|---|
   | 2009/0066852 A1* | 3/2009 | Dai | H04N 5/50 348/731 |
   | 2013/0091251 A1* | 4/2013 | Walker | H04N 21/6125 709/219 |
   | 2013/0246643 A1 | 9/2013 | Luby et al. | |
   | 2013/0282917 A1* | 10/2013 | Reznik | H04N 21/4402 709/231 |
   | 2014/0059244 A1 | 2/2014 | Panje et al. | |
   | 2014/0301437 A1 | 10/2014 | Wang | |
   | 2014/0301463 A1 | 10/2014 | Rusanovskyy et al. | |
   | 2014/0301485 A1 | 10/2014 | Ramasubramonian et al. | |
   | 2014/0365675 A1 | 12/2014 | Bhardwaj et al. | |

OTHER PUBLICATIONS

Second Written Opinion of the International Preliminary Examining Authority, International Application No. PCT/US2016/025964, 11 pages, dated Mar. 10, 2017.

"Adaptive Transport Stream Specification", Published on: Feb. 14, 2014 Available at: http://www.cablelabs.com/wp-content/uploads/specdocs/OC-SP-ATS-I01-140214.pdf.

"Ingest HLS", Retrieved on: Feb. 23, 2015 Available at: http://docs.unified-streaming.com/documentation/vod/ingest-hls.html.

Sullivan, et al., "Overview of the High Efficiency Video Coding(HEVC) Standard", In IEEE Transactions on Circuits and Systems for Video Technology, vol. 22, Issue 12, Dec. 2012, pp. 1649-1668.

"New Features", Retrieved on: Feb. 23, 2015 Available at: http://helixproducts.real.com/hmdp/documentation/helixserver/1512_LR/html/Content/HelixHelp/New_Features.htm.

"Announcing the Cloud's Most Efficient HTTP Live Streaming", Published on: Dec. 8, 2011 Available at: http://blog.zencoder.com/2011/12/08/announcing-the-clouds-most-efficient-http-live-streaming/.

International Preliminary Report on Patentability, International Application No. PCT/US2016/025964, 12 pages, dated Jul. 4, 2017.

* cited by examiner

SPLIT PROCESSING OF ENCODED VIDEO IN STREAMING SEGMENTS

BACKGROUND

With the increasing popularity of viewing and/or listening to content, such as music, shows, and movies, over the Internet, there is a need for optimizing the client's viewing experience. Because the Internet is a variable bitrate channel without dedicated bandwidth between the server and client, it is important to have the ability to adjust the bitrate of the content being streamed to the client and to have the ability to adapt to different streaming situations, such as fluctuations in network capacity.

In some situations, streaming services provide audio and/or video content at different bitrates and provide for switching between bitrates over time as network conditions change. However, the process of switching between different bitrate streams can be problematic and can cause decoder issues (e.g., corruption, dropped frames, crashes, etc.).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for split processing of streaming segments in which processing operations are split between a source component and a decoder component (video decoder component). In some implementations, the source component performs operations for scanning the streaming segment and discarding bits before a location at which decoding can begin (e.g., a first decodable I-picture, which can also be called a sync point). The source component then sends the streaming segment to the decoder component to begin decoding at the identified location (e.g., the first decodable I-picture). For example, the source component can receive the streaming segment (e.g., comprising audio and video content bit streams) and demultiplex the streaming segment to separate the video content bit stream. The source component can then scan the video content bit stream to find the first decodable I-picture (e.g., an I-picture with header parameter bits for proper decoding) and send the video content bit stream, beginning with the first decodable I-picture, to the decoder component for decoding. The decoder component can receive the video content bit stream from the source component and begin decoding from the first decodable I-picture. The decoder component can also discard pictures that reference a reference picture prior to the first decodable I-picture that are not present during the decoding process. In some implementations, the source component scans for the first decodable I-picture, and sends the video content bit stream to the decoder beginning from the first decodable I-picture, only for streaming segments at the beginning of a stream switch.

As described herein, a variety of other features and advantages can be incorporated into the technologies as desired.

DETAILED DESCRIPTION

Overview

Figure 1:
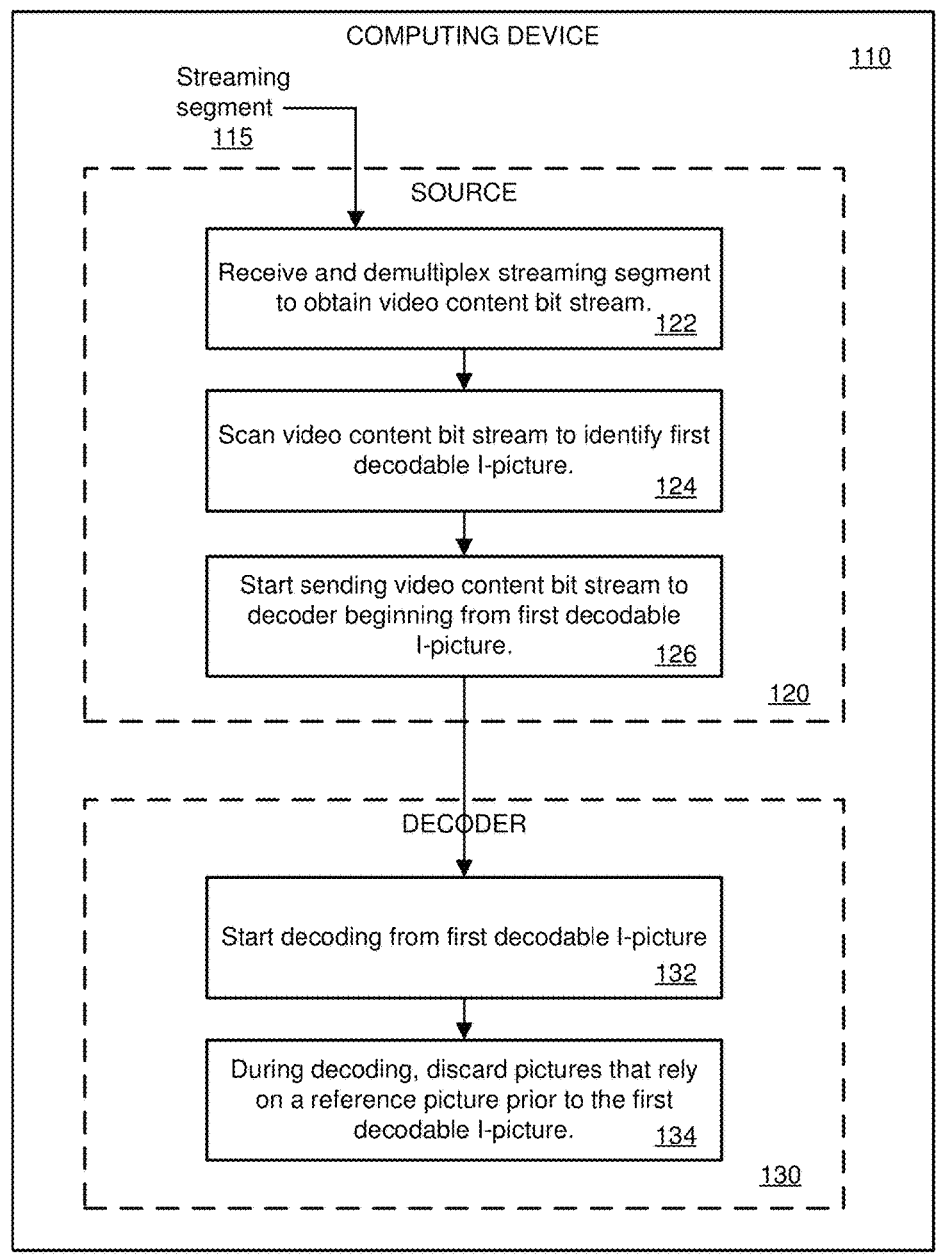
FIG. 1 is a diagram depicting example components for split processing of streaming segments.

As described herein, technologies are provided for split processing of streaming segments in which processing operations are split between a source component and a decoder component. In some implementations, the source component performs operations for scanning the streaming segment and discarding bits before a location at which decoding can begin (e.g., a first decodable I-picture, which can be an I-picture with header parameter bits for proper decoding). The source component then sends the streaming segment to the decoder component to begin decoding at the identified location (e.g., the first decodable I-picture). For example, the source component can receive the streaming segment (e.g., comprising audio and video content bit streams) and demultiplex the streaming segment to separate the video content bit stream. The source component can then scan the video content bit stream to find the first decodable I-picture and send the video content bit stream, beginning with the first decodable I-picture, to the decoder component for decoding. The decoder component can receive the video content bit stream from the source component and begin decoding from the first decodable I-picture. The decoder component can also discard pictures that reference a reference picture prior to the first decodable I-picture that are not present during the decoding process.

Some streaming protocols provide multimedia content (comprising audio and/or video content) for streaming at a variety of different quality levels (e.g., different bit rates, different resolutions, different encoding parameters, etc.). Example streaming protocols include HTTP Live Streaming (HLS), Dynamic Adaptive Streaming over HTTP (DASH, also called MPEG-DASH), and Smooth Streaming. In order to provide the multimedia content at the different quality levels, the audio and/or video content that makes up the multimedia content (e.g., the audio and video of a video clip or movie) is first encoded at a number of different quality levels (e.g., the video may be encoded in a number of different bitrate streams, which can have different encoding settings such as profile, level, bitrate, resolution, etc.). The audio and/or video content is then divided up into segments (also called chunks) where the segments align across the different quality levels. A segment refers to a portion (e.g., a time range) of audio and/or video content that is encoded at a particular quality level. In this way, a client can switch between different quality levels (e.g., switch to a higher or lower bitrate stream) at segment boundaries.

When using a streaming protocol that provides multimedia content in a variety of different quality levels, a streaming session can begin with a first segment of the multimedia content (e.g., a first few seconds of audio/video content for a movie) encoded at a first quality level. A subsequent segment (e.g., a next few seconds of audio/video content for the movie) can then be provided with the same quality level as the first segment or with a different quality level. For example, the server that is streaming the content and/or the client that is receiving the content can determine which quality level to send or receive depending on various criteria. For example, the server or client can monitor network conditions and switch between different quality level streams as needed (e.g., switch to a higher bitrate segment if network bandwidth increases or switch to a lower bitrate segment if network bandwidth decreases).

However, by allowing multimedia content to be split into segments and provided at different quality levels, problems can occur when a client receives a new segment. For example, a segment comprising video content can be received with information at the beginning of the video content of the segment that is not needed for decoding and/or that causes decoding problems. This information at the beginning of the video portion of the segment (also called extra bits or junk bits) may be left over from the process of dividing the steam into segments (e.g., it may be a remnant of a previous segment where the split did not occur at an I-picture boundary). In some situations, different encoders are used to encode the different quality level streams, which can result in key frames (e.g., I-pictures) that are not aligned at the same time position across the different streams. Dealing with this information at the beginning of the video portion can require increased computing resources (e.g., the decoder may have to spend extra time and use additional memory in dealing with the extra bits). In addition, trying to process this information may result in corruption of the decoded video content and/or other types of decoder errors (e.g., a decoder crash). Therefore, by scanning the beginning of the streaming segment (e.g., the beginning of the video content bit stream demultiplexed from the streaming segment) and locating the first decodable I-picture, computing resources can be saved and other types of errors (e.g., corruption, crashes, etc.) can be reduced for down-stream components.

Furthermore, even if the decoder begins decoding a segment with an I-picture, there may be subsequent pictures in the segment that cannot be decoded (or decoded properly). For example, a subsequent P-picture or B-picture (subsequent to the I-picture) may reference a reference picture prior to the I-picture that is not present with the video content bit stream for the segment. Encountering such pictures that cannot be decoded (or that cannot be properly decoded) can result in the decoder spending extra computing resources dealing with the situation and/or cause decoder errors (e.g., corruption, crashes, etc.). Therefore, by discarding such subsequent pictures that cannot be decoded (or decoded properly), computing resources can be saved and other types of errors (e.g., corruption, crashes, etc.) can be reduced.

Split Processing of Streaming Segments

In the technologies described herein, operations for processing video content within streaming segments are split between a source component (also called a demultiplexer component). For example, the source component can receive the streaming segment, demultiplex the streaming segment to separate the video content bit stream, scan the video content bit stream for, and up to, the first decodable I-picture, and send the video content bit stream to the decoder component to decode the video content bit stream beginning with the first decodable I-picture. The decoder component can also discard pictures that are not decodable (e.g., pictures that reference a reference picture that is not present in the video content bit stream, such as a reference picture prior to the first decodable I-picture).

FIG. 1 is a diagram depicting example components of a computing device 110 for split processing of streaming segments. For example, the computing device 110 can be a desktop computer, laptop computer, server, set-top box, entertainment device, gaming console, or another type of computing device. The computing device 110 comprises a number of components for processing streaming segments, including a source component 120 and a decoder component 130. The source component 120 and decoder component 130 can be separate components or they can be part of a multimedia processing package. The source component 120 and decoder component 130 may be implemented in software and/or hardware of the computing device 110. The decoder component 130, also called a video decoder component, implements a video decoder (e.g., for decoding video content according to one or more video coding standards, such as H.264, HEVC, etc.).

The source component 120 (also called a demultiplexer component) receives streaming segments and separates out the video content. The source component 120 scans the video content and removes extra information at the beginning before sending the video content to the decoder component 130. Specifically, in some implementations, the source component 120 receives and demultiplexes a streaming segment to obtain the video content bit stream, as depicted at 122. The source component 120 then scans the video content bit stream to identify the first decodable I-picture, as depicted at 124. The first decodable I-picture is the first I-picture in the video content bit stream that is decodable (e.g., for which sufficient information has been received in the video content bit stream to allow the I-picture to be decodable). While the first decodable I-picture is decodable, there may still be subsequent pictures that are not decodable because they rely on a reference picture prior to the first decodable I-picture. Therefore the first decodable picture is an open decoding refresh (ODR) picture, but is not required to be an instantaneous decoding refresh (IDR) picture. The source component 120 starts sending the video content bit stream to the decoder component 130 beginning from the first decodable I-picture, as depicted at 126.

The decoder component 130 receives video content from the source component 120 with extra information removed from the beginning of the video content that can otherwise cause decoding problems (e.g., extra processing time, corruption, crashes, etc.). The decoder component 130 also discards pictures that are not decodable. Specifically, in some implementations, the decoder component 130 receives the video content bit stream (sent from the source component 120, as depicted at 126) and starts decoding the video content bit stream from the first decodable I-picture, as depicted at 132. During decoding, the decoder component 130 discards pictures that rely on a reference picture prior to the first decodable I-picture, as depicted at 134. The duration of a prior decoded picture can be extended by the decoder component 130 to compensate for one or more pictures that are discarded as relying on a reference picture prior to the first decodable I-picture.

The decoder component 130 can output decoded video content. For example, the decoder component 130 can provide the video content decoded from the video content bit stream for display by the computing device 110, for sending to another computing device, for storing in a file, etc.

In some implementations, the source component (e.g., source component 120) performs operations that are not performed by the decoder component (e.g., by decoder component 130). For example, the decoder component may not be configured to scan (or be capable of scanning) the beginning of the video bit stream for extra information that is not decodable (e.g., information before a first decodable I-picture). Therefore, it can be beneficial to have a source component that performs operations for scanning the video content bit stream and discards extra bits at the beginning before sending the video content bit stream to the decoder component to avoid having the decoder component spend time and resources dealing with the extra bits.

In some implementations, the decoder component (e.g., decoder component 130) performs operations that are not performed by the source component (e.g., by source component 120). For example, the source component may not be capable of detecting (or be configured to detect) subsequent pictures that are not decodable. For example, the source component may not be capable of decoding the video content bit stream to determine pictures subsequent to the first decodable I-picture that are not decodable (e.g., that rely on a reference picture prior to the first decodable I-picture). Therefore, it can be beneficial to have a decoder component that performs operations for discarding pictures, subsequent to the first decodable I-picture in a video content bit stream, that are not decodable (e.g., that rely on a reference picture prior to the first decodable I-picture).

In some implementations, the source component 120 also processes audio content. For example, the source component 120 can receive a streaming segment and demultiplex the streaming segment to separate out the audio content and the video content. The source component 120 can perform operations depicted at 122, 124, and 126 for the video content bit stream. The source component 120 can perform other operations for the audio content bit stream. For example, the source component 120 can send the audio content bit stream to an audio decoder component (not depicted) of the computing device 110 that decodes audio content according to one or more audio coding standards (e.g., Advanced Audio Coding (AAC), Dolby® Digital (also called AC-3), etc.).

Figure 2:
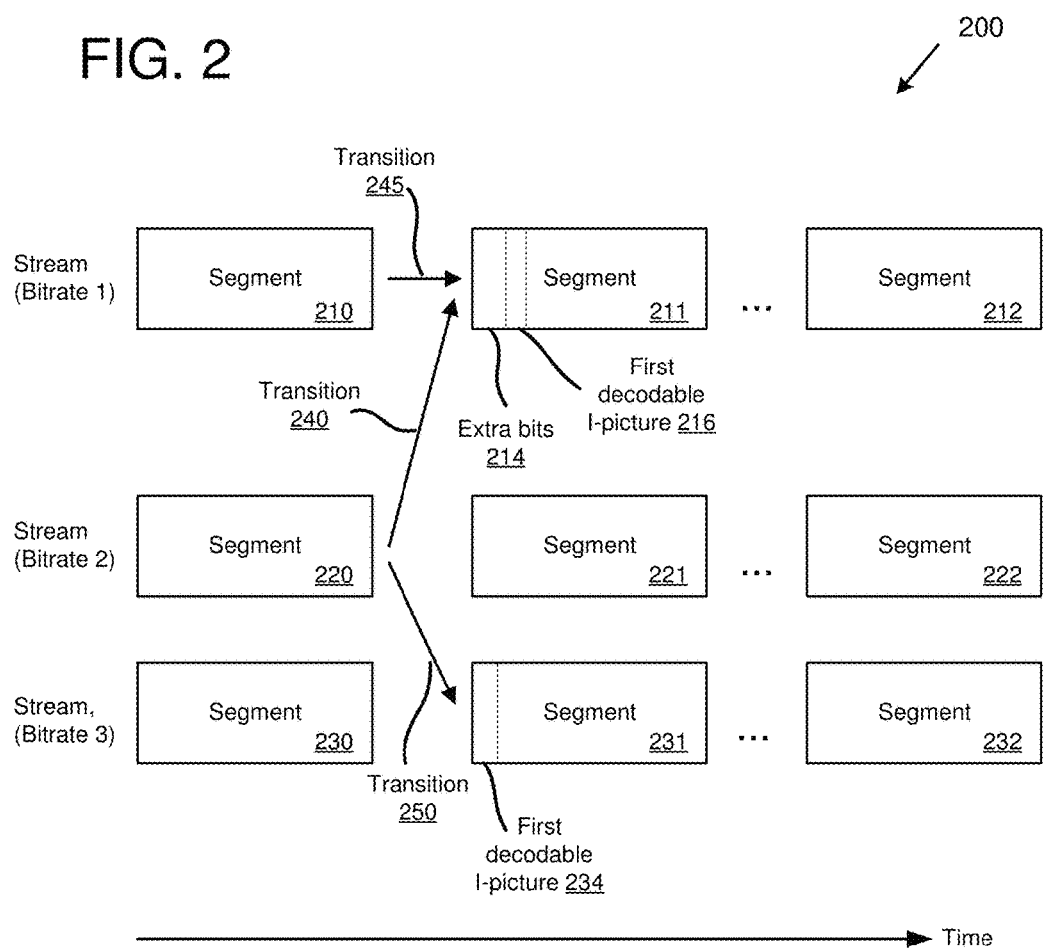
FIG. 2 is a diagram depicting example multimedia streams comprising streaming segments and depicting example transitions between streaming segments.

FIG. 2 is a diagram depicting example multimedia streams 200 comprising streaming segments, and depicting example transitions between the streaming segments. The example multimedia streams 200 reflect multimedia content that has been encoded at three different bitrates (e.g., video content encoded at 250 Kb/sec, 500 Kb/sec, and 1 Mb/sec), and the three different bitrate streams have been divided into streaming segments. Specifically, there are three streaming segments depicted for the first bitrate stream (segments 210, 211, and 212), three streaming segments depicted for the second bitrate stream (segments 220, 221, and 222), and three streaming segments depicted for the third bitrate stream (segments 230, 231, and 232). In general, multimedia content can be encoded at a variety of different encoding levels (e.g., more or fewer than three bitrates) and divided into any number of streaming segments.

For ease of illustration, the streaming segments of FIG. 2 only depict video content. However, a streaming segment may contain audio content as well (e.g., one or more audio tracks multiplexed along with the video content in a container format according to a streaming protocol, such as HLS). In some implementations, separate streaming segments are used to encode video content and audio content for a particular bitrate stream. In other implementations, the same streaming segment contains both video content and audio content. In addition, in some implementations video content and/or audio content can comprise one or more tracks (e.g., different audio tracks representing different languages for a video clip or movie).

With reference to FIG. 2, a number of example streaming scenarios can be described that illustrate operation of some aspects of the technology described herein. For example, consider the scenario where a client device is streaming video content (and optionally audio content as well) using the second bitrate stream. Specifically, the client has received and decoded streaming segment 220 and is switching streams to the first bitrate stream (e.g., due to a change in network bandwidth). Upon switching to the first bitrate stream (as indicated by transition 240), the client receives streaming segment 211. Streaming segment 211 has extra bits 214 at the beginning of the video content bit stream followed by a first decodable I-picture 216. Therefore, when the client receives and demultiplexes streaming segment 211, the client scans the video content bit stream until the first decodable I-picture 216 is found. The client provides the video content bit stream, beginning with the first decodable I-picture 216, to a decoder component for decoding. The extra bits 214 are not sent to the decoder, and can be discarded.

As another example, consider the scenario where the client is streaming video content (and optionally audio content as well) using the second bitrate stream. Specifically, the client has received and decoded streaming segment 220 and is switching streams to the third bitrate stream (e.g., due to a change in network bandwidth). Upon switching to the third bitrate stream (as indicated by transition 250), the client receives streaming segment 231. Streaming segment 231 has a first decodable I-picture 234 at the beginning without any extra bits. Therefore, when the client receives and demultiplexes streaming segment 231, the client scans the video content bit stream and finds the first decodable I-picture 234 at the beginning. The client provides the video content bit stream, beginning with the first decodable I-picture 234 (in this situation, the beginning of the video content bit stream), to a decoder component for decoding (e.g., with no extra bits to discard).

In some situations, the first I-picture of a given streaming segment may not be the first decodable I-picture of the given streaming segment. In such situations, the streaming segment is scanned (e.g., by the source component) until the first decodable I-picture is found, from which point the video content bit stream is provided for decoding (e.g., by the decoding component). Therefore, the bits that are discarded at the beginning of the given segment can include I-pictures that are not decodable (or not properly decodable), and other pictures such as P-pictures and B-pictures, prior to the first decodable I-picture.

As another example, consider the scenario where the client is streaming video content (and optionally audio content as well) using the first bitrate stream. Specifically, the client has received and decoded streaming segment 210 and is continuing to stream segments using the first bitrate stream (i.e., the client is not switching streams), as indicated by transition 245. In this scenario, the client receives the next streaming segment 211 in the first bitrate stream. In some implementations, the client does not scan the beginning of streaming segment 211 because the client has not switched streams. In such implementations, decoding can proceed without issues because the extra bits 214 are properly decodable from the end of streaming segment 210 (e.g., even though streaming segments 210 and 211 were not split at a decodable I-picture boundary, the extra bits 214 are properly decodable when the decoder decodes the end of streaming segment 210 and continues decoding directly from streaming segment 211). In other implementations, the client proceeds to scan the beginning of the streaming segment 211 for the first decodable I-picture 216 and discards the extra bits 214.

In some implementations, scanning of a received streaming segment for the first decodable I-picture is only performed when switching streams. With reference to FIG. 2, transitions 240 and 250 would result in the source component scanning the streaming segment received following the transition for the first decodable I-picture. However, a transition not involving a stream switch (e.g., transition 245) would not result in scanning of the following streaming segment. By only scanning streaming segments when a stream switch is performed, computing resources (e.g., processor utilization, memory, and time) can be reduced (e.g., by the source component), particularly when the frequency of stream switching is low.

In some implementations, the decoder component always checks pictures of a streaming segment to make sure they are decodable (e.g., that they do not reference a reference picture that is not present in the video content bit stream of the streaming segment). In other implementations, the decoder component only checks pictures of a streaming segment to make sure they are decodable upon a stream switch (e.g., for just the first streaming segment after a stream switch).

Methods for Split Processing of Streaming Segments

In any of the examples herein, methods can be provided for split processing of video content within streaming segments. For example, a source component can receive and demultiplex a streaming segment, scan the video content bit stream up to the first decodable I-picture, and send the video content bit stream to a decoder component for decoding beginning with the first decodable I-picture. The decoder component can decode the video content bit stream and discard pictures that are not properly decodable (e.g., that reference a reference picture prior to the first decodable I-picture). In some implementations, the source component only scans for the first decodable I-picture upon a stream switch (e.g., when receiving the first streaming segment after switching to a new quality level stream).

Figure 3:
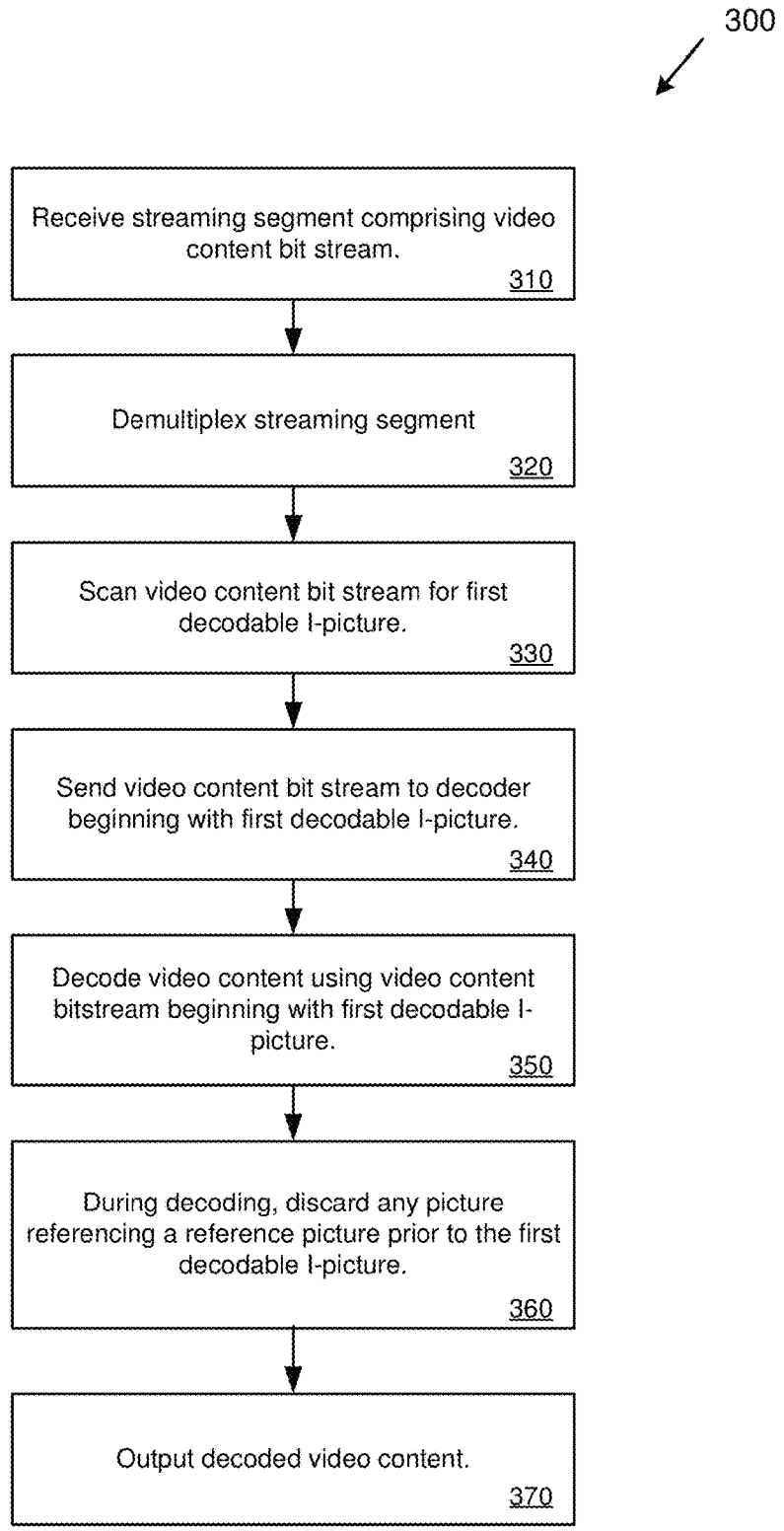
FIG. 3 is a flowchart of an example method for split processing of streaming segments.

FIG. 3 is a flowchart of an example method 300 for split processing of streaming segments. The example method 300 can be performed, at least in part, by a computing device, such as the computing device 110 described with reference to FIG. 1.

At 310, a streaming segment is received (e.g., by a source component). The streaming segment comprises a video content bit stream. The streaming segment can also comprise audio content encoded in an audio content bit stream.

At 320, the streaming segment is demultiplexed (e.g., by the source component). Demultiplexing the streaming segment separates the video content bit stream.

At 330, the video content bit stream is scanned (e.g., by the source component) up to a first decodable I-picture. In other words, scanning is performed starting from the beginning of the video content bit stream until the first decodable I-picture is reached in the video content bit stream. Information at the beginning of the video content bit stream (e.g., extra bits) before the first decodable I-picture can be discarded or otherwise ignored.

In some implementations, the first decodable I-picture in a video content bit stream is located by parsing header information of the video content bit stream to find the first I-picture (e.g., which can be identified in some situations as the first picture where all slices are I-slices) that also has an associated picture parameter set (PPS) and sequence parameter set (SPS) (e.g., encoded with the I-picture and/or received prior to the I-picture, such as received in prior header information).

At 340, the video content bit stream is sent to a video decoder (e.g., a decoder component for decoding video content encoded according to one or more video coding standards) beginning with the first decodable I-picture. Any extra bits in the video content bit stream before the first decodable I-picture are not sent to the video decoder (e.g., they are discarded).

At 350, video content is decoded by the decoder (e.g., by the decoder component) using the video content bit stream beginning with the first decodable I-picture. At 360, during decoding any picture that references a reference picture prior to the first decodable I-picture in the video content bit stream is discarded.

At 370, the decoded video content is output (e.g., by the decoder component). For example, the decoded video content can be provided for display, sent to another device, stored in a file, etc.

Figure 4:
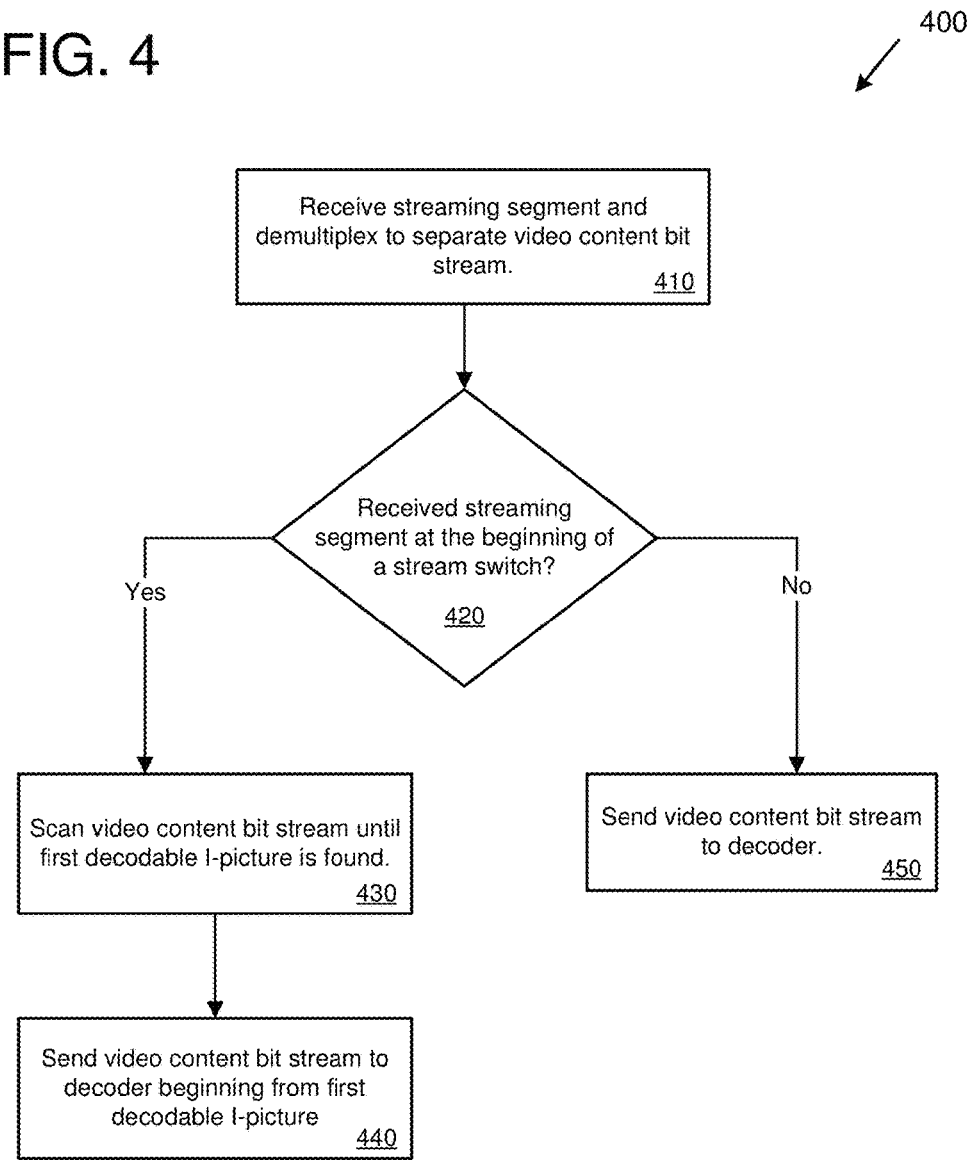
FIG. 4 is a flowchart of an example method for scanning a video content bit stream depending on whether the streaming segment is at the beginning of a stream switch.

FIG. 4 is a flowchart of an example method 400 for scanning a video content bit stream depending on whether the streaming segment is at the beginning of a stream switch. The example method 400 can be performed, at least in part, by a computing device, such as the computing device 110 described with reference to FIG. 1.

At 410, a streaming segment is received and demultiplexed to separate the video content bit stream (e.g., from other bit streams, such as audio bit streams, that may be present in the streaming segment). At 420, different operations are performed depending on whether the received streaming segment is at the beginning of a stream switch. When the received streaming segment is at the beginning of a stream switch, the method proceeds to 430 where the video content bit stream is scanned until the first decodable I-picture is found. In other words, scanning is performed starting from the beginning of the video content bit stream until the first decodable I-picture is reached in the video content bit stream. At 440, the video content bit stream is then sent to a decoder to begin decoding from the first decodable I-picture. However, when the received streaming segment is not at the beginning of a stream switch, the method proceeds to 450, where the video content bit stream is sent to the decoder without performing the processing operations depicted at 430 and 440.

Figure 5:
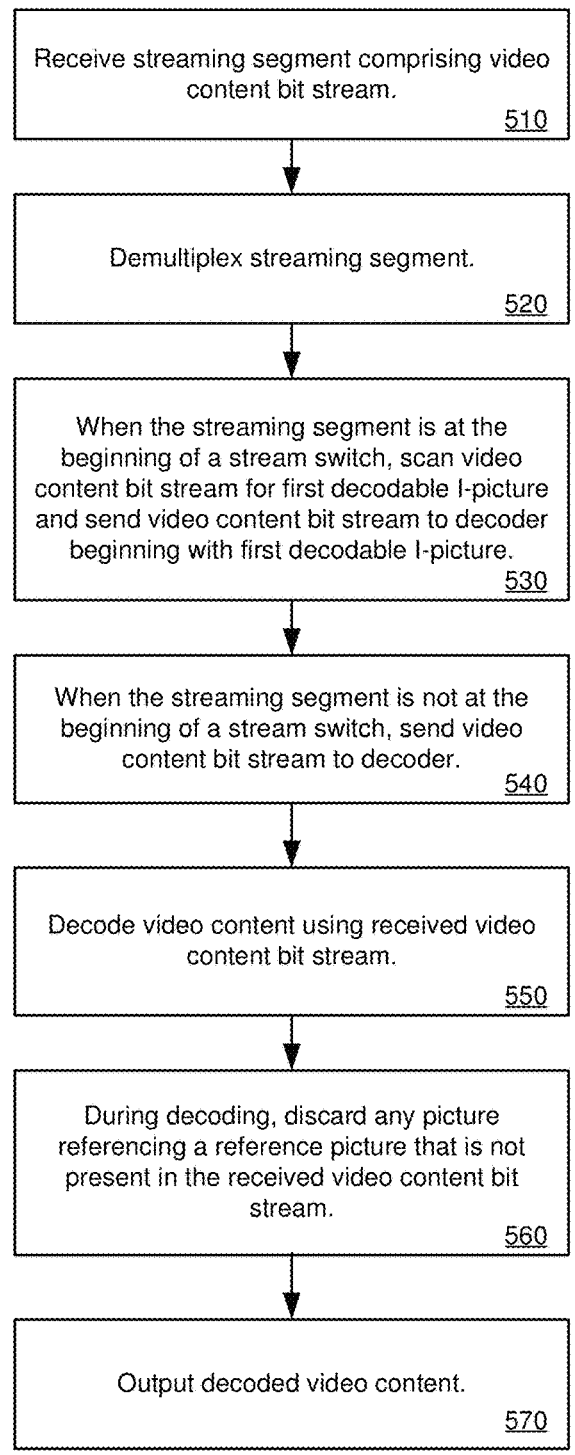
FIG. 5 is a flowchart of an example method for split processing of streaming segments.

FIG. 5 is a flowchart of an example method 500 for split processing of streaming segments. The example method 500 can be performed, at least in part, by a computing device, such as the computing device 110 described with reference to FIG. 1.

At 510, a streaming segment is received (e.g., by a source component). The streaming segment comprises a video content bit stream. The streaming segment can also comprise audio content encoded in an audio content bit stream.

At 520, the streaming segment is demultiplexed (e.g., by the source component). Demultiplexing the streaming segment separates the video content bit stream.

At 530, when the streaming segment is at the beginning of a stream switch, the video content bit stream is scanned (e.g., by the source component) until a first decodable I-picture is found. In other words, scanning is performed starting from the beginning of the video content bit stream until the first decodable I-picture is reached in the video content bit stream. Information at the beginning of the video content bit stream (e.g., extra bits) before the first decodable I-picture can be discarded or otherwise ignored. The video content bit stream is sent to a video decoder (e.g., a decoder component for decoding video content encoded according to one or more video coding standards) beginning with the first decodable I-picture.

In some implementations, the first decodable I-picture is located by parsing header information of the video content bit stream to find the first I-picture (e.g., which can be identified in some situations as the first picture where all slices are I-slices) that also has an associated picture parameter set (PPS) and sequence parameter set (SPS) (e.g., encoded with the I-picture and/or received prior to the I-picture, such as received in prior header information).

At 540, when the streaming segment is not at the beginning of a stream switch, the video content bit stream is sent to the video decoder without extra bits at the beginning being discarded.

At 550, video content is decoded by the decoder (e.g., by the decoder component) using the video content bit stream received by the decoder. Decoding can begin from the first decodable I-picture (upon stream switch) or from the beginning of the original video content bit stream (when there was no stream switch). At 560, during decoding any picture that references a reference picture that is not present in the received video content bit stream is discarded.

At 570, the decoded video content is output (e.g., by the decoder component). For example, the decoded video content can be provided for display, sent to another device, stored in a file, etc.

Computing Systems

Figure 6:
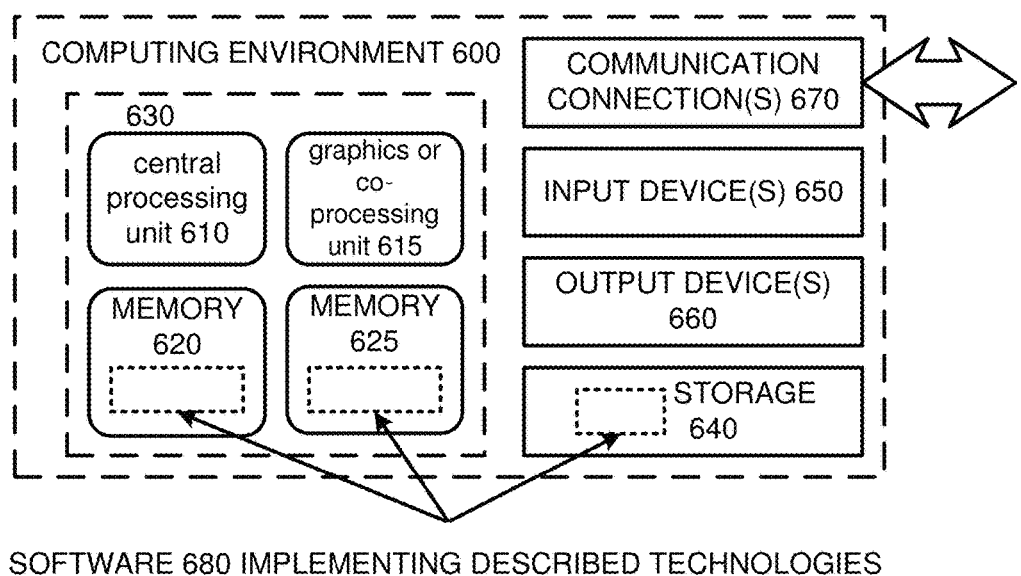
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 7:
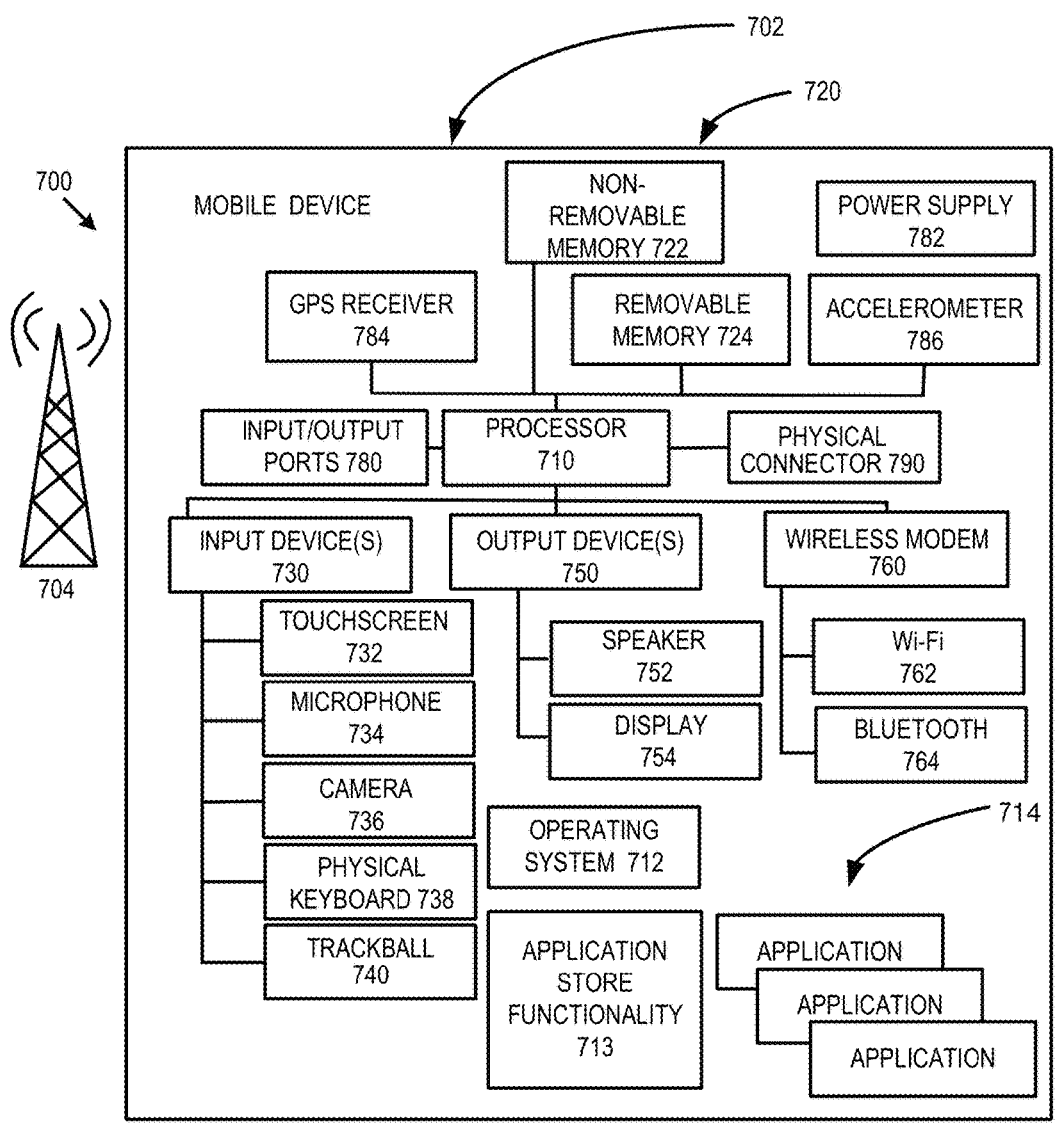
FIG. 7 is an example mobile device that can be used in conjunction with the technologies described herein.

FIG. 7 is a system diagram depicting an example mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Cloud-Supported Environment

Figure 8:
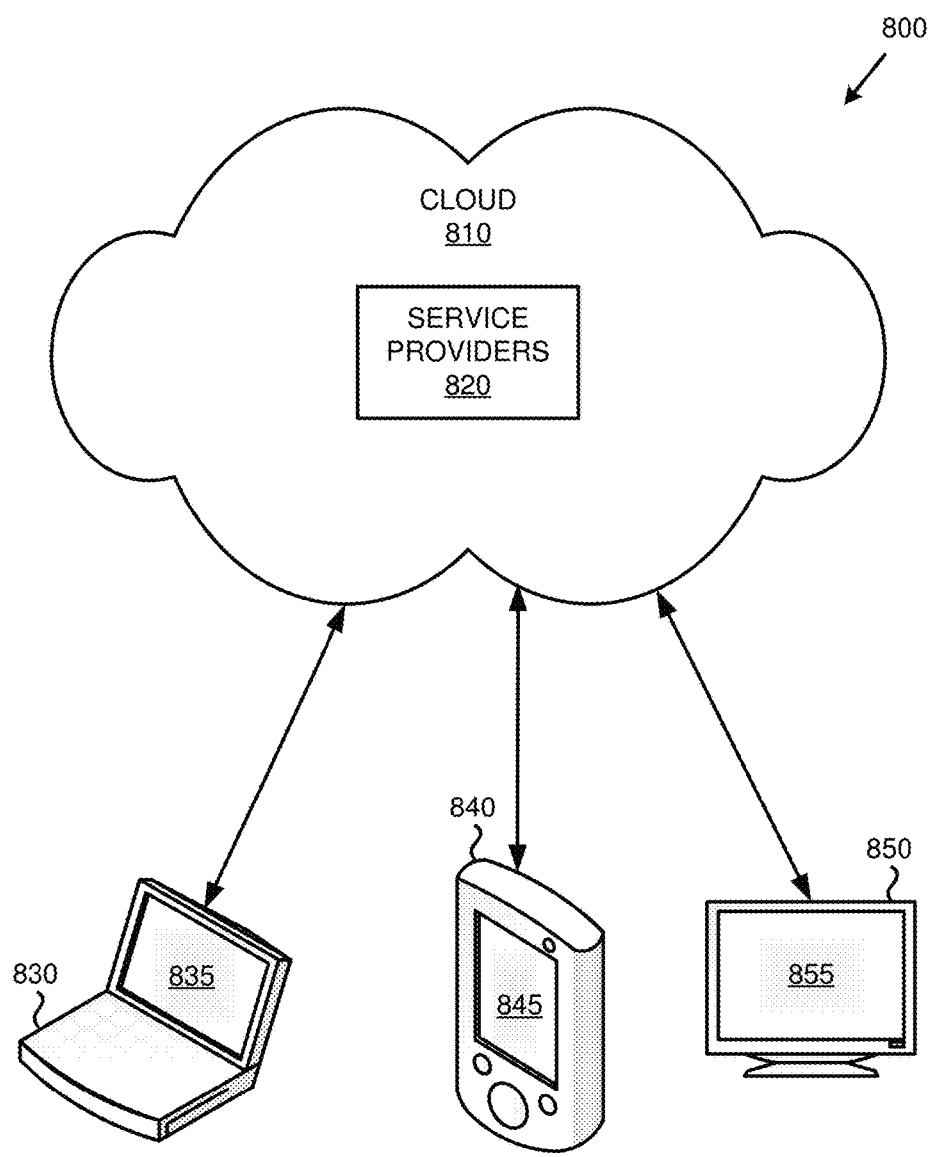
FIG. 8 is an example cloud-support environment that can be used in conjunction with the technologies described herein.

FIG. 8 illustrates a generalized example of a suitable cloud-supported environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include signals and carrier waves. In addition, the term computer-readable storage media does not include communication connections (e.g., 670, 760, 762, and 764).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processing unit;
   memory;
   a source component; and
   a decoder component;
   the processing unit configured to perform operations for split processing of streaming segments in a format according to a streaming protocol, the operations comprising:
      by the source component:
         receiving a streaming segment that is at a beginning of a stream switch from a previous streaming segment, the streaming segment comprising a video content bit stream;
         demultiplexing the streaming segment to separate the video content bit stream;
         scanning the video content bit stream, from a location at which the stream switch occurred, up to a first decodable I-picture; and sending the video content bit stream beginning with the first decodable I-picture to the decoder component, wherein bits in the video content bit stream before the first decodable I-picture are not sent to the decoder component; and by the decoder component:
  decoding video content using the video content bit stream received from the source component beginning with the first decodable I-picture;
  during the decoding of the video content, discarding one or more P or B pictures that are present in the streaming segment after the first decodable I-picture and that are referencing a reference picture that is prior to the first decodable I-picture and not present in the streaming segment, wherein the one or more P or B pictures that are discarded are not decoded by the decoder component; and
  outputting the decoded video content.

2. The computing device of claim 1 wherein the operations for split processing are performed in response to determining that the received streaming segment is at a beginning of a stream switch from a previous streaming segment.

3. The computing device of claim 1 wherein the first decodable I-picture is a first I-picture in the video content bit stream that has an associated picture parameter set (PPS) and sequence parameter set (SPS).

4. The computing device of claim 1 wherein scanning the video content bit stream up to the first decodable I-picture comprises:
  parsing a header of the video content bit stream until a first I-picture is found, starting from the beginning of the video content bit stream, for which an associated picture parameter set (PPS) and sequence parameter set (SPS) have also been found.

5. The computing device of claim 1 further comprising, by the source component:
  discarding the bits in the video content bit stream before the first decodable I-picture.

6. The computing device of claim 1 further comprising, by the decoder component:
  extending a duration of a prior decoded picture to compensate for one or more pictures that are discarded as relying on a reference picture prior to the first decodable I-picture.

7. The computing device of claim 1 wherein the streaming protocol is HTTP Live Streaming (HLS).

8. A method for split processing of streaming segments in a format according to a streaming protocol, the method comprising:
  by a source component:
    receiving a streaming segment, the streaming segment comprising a video content bit stream;
    demultiplexing the streaming segment to separate the video content bit stream;
    when the received streaming segment is at a beginning of a stream switch from a previous streaming segment:
      scanning the video content bit stream, from a location at which the stream switch occurred, up to a first decodable I-picture; and
      sending the video content bit stream beginning with the first decodable I-picture to a decoder component, wherein bits in the video content bit stream before the first decodable I-picture are not sent to the decoder component; and
    when the received streaming segment is not at a beginning of a stream switch from a previous streaming segment:
      sending the video content bit stream to the decoder component; and
  by the decoder component:
    decoding video content using the video content bit stream received from the source component;
    when the received streaming segment is at a beginning of a stream switch from a previous streaming segment, during the decoding of the video content, discarding one or more P or B pictures that are present in the streaming segment after the first decodable I-picture and that are referencing a reference picture that is not present in the video content bit stream of the streaming segment received from the source component, wherein the one or more P or B pictures that are discarded are not decoded by the decoder component; and
    outputting the decoded video content.

9. The method of claim 8 wherein the first decodable I-picture is a first I-picture in the video content bit stream that has an associated picture parameter set (PPS) and sequence parameter set (SPS).

10. The method of claim 8 wherein scanning the video content bit stream up to the first decodable I-picture comprises:
  parsing a header of the video content bit stream until a first I-picture is found, starting from the beginning of the video content bit stream, for which an associated picture parameter set (PPS) and sequence parameter set (SPS) have also been found.

11. The method of claim 8 further comprising, by the source component when the received streaming segment is at a beginning of a stream switch from a previous streaming segment:
  discarding the bits in the video content bit stream before the first decodable I-picture.

12. The method of claim 8 further comprising, by the decoder component:
  extending a duration of a prior decoded picture to compensate for one or more pictures that are discarded as relying on a reference picture not present in the video content bit stream received from the source component.

13. The method of claim 8 wherein the first decodable I-picture is a first I-picture in the video content bit stream for which sufficient information has been received in the video content bit stream for decoding the first I-picture by the decoding component.

14. The method of claim 8 wherein the streaming protocol is HTTP Live Streaming (HLS).

15. A computer-readable storage memory or storage device storing computer-executable instructions for causing a computing device to perform operations for split processing of streaming segments in a format according to a streaming protocol, the operations comprising:
  by a source component:
    receiving a streaming segment that is at a beginning of a stream switch from a previous streaming segment, the streaming segment comprising a video content bit stream;
    demultiplexing the streaming segment to separate the video content bit stream;
    scanning the video content bit stream, from a location at which the stream switch occurred, up to a first decodable I-picture; and sending the video content bit stream beginning with the first decodable I-picture to a decoder component, wherein bits in the video content bit stream before the first decodable I-picture are not sent to the decoder component; and by the decoder component:

decoding video content using the video content bit stream received from the source component beginning with the first decodable I-picture;

during the decoding of the video content, discarding one or more P or B pictures that are present in the streaming segment after the first decodable I-picture and that are referencing a reference picture that is prior to the first decodable I-picture and not present in the streaming segment, wherein the one or more P or B pictures that are discarded are not decoded by the decoder component; and outputting the decoded video content.

16. The computer-readable storage memory or storage device of claim 15 wherein the operations for split processing are performed in response to determining that the received streaming segment is at a beginning of a stream switch from a previous streaming segment.

17. The computer-readable storage memory or storage device of claim 15 wherein the first decodable I-picture is a first I-picture in the video content bit stream that has an associated picture parameter set (PPS) and sequence parameter set (SPS).

18. The computer-readable storage memory or storage device of claim 15 wherein scanning the video content bit stream up to the first decodable I-picture comprises:

parsing a header of the video content bit stream until a first I-picture is found, starting from the beginning of the video content bit stream, for which an associated picture parameter set (PPS) and sequence parameter set (SPS) have also been found.

19. The computer-readable storage memory or storage device of claim 15 the operations further comprising, by the source component:

discarding the bits in the video content bit stream before the first decodable I-picture.

20. The computer-readable storage memory or storage device of claim 15 the operations further comprising, by the decoder component:

extending a duration of a prior decoded picture to compensate for one or more pictures that are discarded as relying on a reference picture prior to the first decodable I-picture.

* * * * *